United States Patent [19]
Abraham

[11] Patent Number: 5,592,482
[45] Date of Patent: Jan. 7, 1997

[54] VIDEO DISTRIBUTION SYSTEM USING IN-WALL WIRING

[76] Inventor: Charles Abraham, 804 Cheswold Ct., Wayne, Pa. 19087

[21] Appl. No.: 304,495

[22] Filed: Sep. 12, 1994

Related U.S. Application Data

[63] Continuation-in-part of Ser. No. 180,421, Jan. 11, 1994, which is a continuation of Ser. No. 822,326, Jan. 17, 1992, abandoned, which is a continuation of Ser. No. 515,578, Apr. 26, 1990, abandoned, which is a continuation-in-part of Ser. No. 429,208, Oct. 30, 1989, abandoned, which is a continuation-in-part of Ser. No. 344,907, Apr. 28, 1989, abandoned.

[51] Int. Cl.$^6$ ............................................. H04J 3/02
[52] U.S. Cl. ..................... 348/8; 375/260; 340/310.03; 340/310.05; 340/310.07
[58] Field of Search ................................. 370/85.1, 85.8, 370/85.9; 375/259, 260, 200; 340/310.01, 310.03, 310.05, 310.07; 348/6, 7, 8, 17

[56] References Cited

U.S. PATENT DOCUMENTS

| | | | |
|---|---|---|---|
| 4,994,909 | 2/1991 | Graves et al. | 348/7 |
| 5,010,399 | 4/1991 | Goodman et al. | 348/17 |
| 5,247,347 | 9/1993 | Litteral et al. | 358/85 |
| 5,327,230 | 7/1994 | Dockery | 348/8 |
| 5,334,975 | 8/1994 | Wachob et al. | 348/8 |
| 5,351,272 | 9/1994 | Abraham | 375/260 |

OTHER PUBLICATIONS

"Color Bursts", Communications Engineering and Design, p. 10, (Nov. 1992).

"Transmission of Full–Motion Analog and Digital Video and other Wideband Signals over the Twisted Pair Wiring Internal and Apartment and Office Buildings", Inline Connection Corporation, pp. 1–19, (Jul. 1993).

David D. Goodman, "Using the Telephone Wires Internal to a Residence for the Distribution of Broadband Signals to Settops and Computers", Inline Connection Corporation Standards Project, pp. 1–14, (Aug. 1993).

David D. Goodman, "Distribution of Broadband Signals to the Individual Units of an Apartment Building using Internal Telephone Wires", Inline Connection Corporation Standards Project, pp. 1–6, (Aug. 1993).

Eric Miller, "Creating a critical vehicle for the new 'information superhighways'", Microware Interactive Digital Television Networks, pp. 1–6.

David D. Goodman, "Using the IEEE LAN Coding System to Communicate Bitstreams across Internal Telephone Wiring (in Coordination with Transmission of Analog Video)", Inline Connection Corporation Standards Project, pp. 1–9, (Nov. 1993).

David D. Goodman, "On 2–Way Broadband Communication over POTS Internal to the Residence", Inline Connection Corporation Standards Project, pp. 1–19, (Oct. 1993).

*Primary Examiner*—Douglas W. Olms
*Assistant Examiner*—Shick Hom
*Attorney, Agent, or Firm*—Famiglio & Massinger

[57] ABSTRACT

A cable television/video distribution and selection system for distributing video signals throughout a home or building over in-wall electrical wiring. A remote device is connected to a display monitor or television set and also to the electrical wiring through an electrical outlet. The remote device is comprised of a first video signal selector device which is used by a user to generate a selection signal which corresponds to the cable television channel which the user has selected. The remote device also includes a transmitter/receiver for sending the selection signal over the electrical wiring to a tuner and then receiving the video signal (television station) from the tuner. The transmitter/receiver matches the characteristic impedance of the electrical wiring and is tuned to a predetermined frequency band. The distribution device is connected to the electrical wiring and also to a video signal source, such as a cable television cable entering the building. The distribution device contains a second transmitter/receiver which is tuned to the same frequency band as the remote device and is similarly matched to the characteristic impedance of the electrical wiring. The distribution device also contains a tuner for tuning the cable television channel corresponding to the selector signal it receives from the remote device. After the requested channel is tuned by the tuner, the video signal is sent back to the remote device for viewing on the display monitor.

25 Claims, 11 Drawing Sheets

VIDEO DISTRIBUTION SYSTEM USING IN-WALL WIRING

RELATED APPLICATIONS

This application is a Continuation-In-Part of U.S. Ser. No. 08/180,421, filed Jan. 11, 1994, which is a continuation-in-part of U.S. Ser. No. 07/822,326, filed Jan. 17, 1992 now abandoned, which is a continuation of U.S. Ser. No. 07/515,578, filed Apr. 26, 1990 now abandoned, which is a continuation-in-part of U.S. Ser. No. 07/429,208, filed Oct. 30, 1989 now abandoned, which is a continuation-in-part of U.S. Ser. No. 07/344,907, filed Apr. 28, 1989 now abandoned.

FIELD OF THE INVENTION

The present invention relates to a video distribution and selection system used to distribute cable television (CATV) and video signals over existing AC wiring in a building.

BACKGROUND OF THE INVENTION

A common system for distributing television signals is known as a cable television system. Cable television systems distribute television channels over coaxial cable networks laid out between a cable broadcasting facility and a cable customer's house or building. With the advent of fiber optics, fiber optic cable is also used for the cable television network which exists between the cable broadcasting facility and a customer's home.

Regardless of whether the cable signal is distributed over fiber optic cable or coaxial cable, when the cable hook-up is made at a customer's home, coaxial cable is currently used to distribute the cable television signal throughout a customer's house. In structures built before the advent of cable television and coaxial cable usage, there is no existing cabling in the structure. If cable television is desired, it is necessary to wire each room in the building where a television set is to be used. As pointed out in Applicant's co-pending applications, this requires running new coaxial cable to each room where a television set is to be used and may involve draping cable over the outside walls of the house and drilling through the walls or the window frames of each room to run the cable. In order to provide multiple outlets in a particular room, it is necessary to split the cable and snake the cable through the walls or ceiling or along the baseboards to the desired locations. These requirements can be expensive, unsightly, and cause a degree of damage to the external and internal walls of the building.

Even in new construction, coaxial cable wiring has its disadvantages. The new construction may be "under wired" by not running cable to every room in the building where a television set will ultimately be used. Further, there may be only one cable television outlet installed per room. If a user's ultimate layout of a room does not include a television on the wall where the cable television outlet is located, it is necessary to run a cable wire from the outlet to the location of the television set.

With the increasing number of stations available through cable television, users may require and/or desire access to all of the available stations. In the current cable television systems, all cable television channels are broadcast throughout the house over the coaxial cable. As the number of available channels approaches into the hundreds, the present system becomes unworkable as there is a limit of approximately 100 channels (of programming) which can be simultaneously broadcast over conventional coaxial cable in an uncompressed analog format. This results in a limitation of present cable distribution systems within a house or other structure.

Another limitation of present cable systems relates to the Pay Per View channels. Pay Per View channels require a user to communicate the channel which the user desires to view to the cable television broadcasting facility. The cable television broadcasting facility then sends a signal to the user's cable selector box, allowing the signal for the requested channel to be viewed.

Selecting a Pay Per View channel incurs an additional cost for the user above the normal cable charges. Pay Per View programs are typically selected by tuning to a particular Pay Per View channel on the user's cable selector which is provided by the cable company. The cable selector box is connected to a telephone outlet in the user's house (in addition to the connection to the cable line). A call is made over the user's telephone line to the cable company through the selector box and the user's account is accordingly noted and debited. The use of Pay Per View in current cable systems requires a telephone outlet in proximity to the cable selector box to connect to the cable selector box in order to allow Pay Per View selection. This multiplies the problem of cable outlets by requiring that not only does every room require a cable outlet in a location convenient for installation of a television, but now requires a telephone outlet in every room. This telephone outlet must also be in proximity to the cable television selector in order to make a connection. The further a telephone outlet is located from the cable television selector box, the longer and more noticeable will be the telephone wiring running between the telephone outlet and cable selector box.

Goodman (U.S. Pat. No. 5,010,399) discloses a video transmission and control system utilizing internal telephone lines to distribute a television signal. One of the limitations of Goodman is that in order to simultaneously transmit more than one video/television signal, it is necessary to tune the receiver/selector of Goodman to an alternate VHF channel. For example, if a first receiver/selector is operating on VHF channel 3 or 4 (as is common in video communication devices connected to television sets such as cable convertors, VCRs, and laser disc players), a second television selector/receiver is required to operate at a different VHF channel such as channel 5 or 6. As it is not unusual to have more than two television sets operating in a home or building, it is necessary to move upward in the VHF channels to allow additional television sets. Such a system increases the chance of interference from broadcast stations as more channels are used, particularly in overlapping broadcast regimes in urban areas.

Accordingly, it is desirable to be able to operate multiple, inadequate television sets simultaneously within a home or building without the need for coaxial cable. It is also desirable to allow selection of cable television channels or alternate video sources using a device which interfaces with the television on VHF channel 3 or 4 for each of the multiple, independent and simultaneous televisions used.

SUMMARY OF THE INVENTION

The present invention comprises a cable television/video distribution and selection system for distributing video signals throughout a home or building over in-wall electrical wiring. A remote device is connected to a display monitor or television set and also to the electrical wiring through an electrical outlet. The remote device is comprised of a first video signal selector device which is used by a user to generate a selection signal which corresponds to the cable television channel which the user has selected. The remote device also includes a transmitter/receiver for sending the selection signal over the electrical wiring to a tuner and then receiving the video signal (television station) from the tuner. The transmitter/receiver matches the characteristic impedance of the electrical wiring and is tuned to a predetermined frequency band.

The distribution device is connected to the electrical wiring and also to a video signal source, such as a cable television cable entering the building. The distribution device contains a second transmitter/receiver which is tuned to the same frequency band as the remote device and is similarly matched to the characteristic impedance of the electrical wiring. The distribution device also contains a tuner for tuning the cable television channel corresponding to the selector signal it receives from the remote device. After the requested channel is tuned by the tuner, the video signal is sent back to the remote device for viewing on the display monitor.

BRIEF DESCRIPTION OF THE FIGURES

The invention will now be described by way of nonlimiting example, with reference to the attached drawings in which.

DETAILED DESCRIPTION

Figure 1:
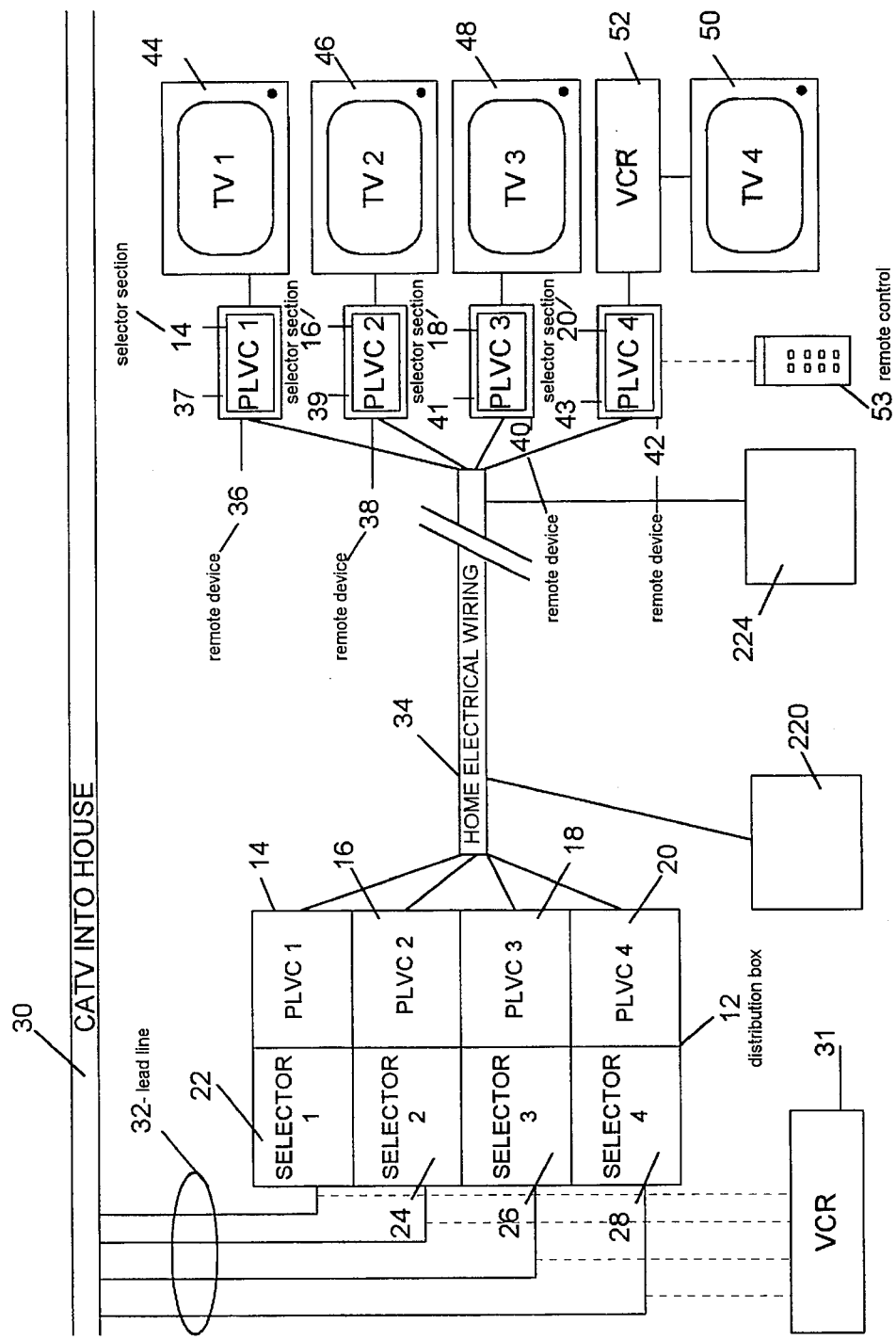
FIG. 1 is a block diagram of a cable television/video distribution and selection system in accordance with the present invention.

There is shown in FIG. 1 a block diagram of an exemplary cable television and video distribution and selection system 10 constructed in accordance with the present invention. System 10 can be setup in any home or other building which is wired with AC electrical wiring, such as 3 strand (ground, hot, neutral) used in home and building construction.

System 10 allows the operation of up to four simultaneously and independently operated television sets or other viewing or recording devices, such as a monitor or VCR. System 10 is designed to operate using analog signals distributed throughout a home or building and thus, does not require more expensive digital to analog and analog to digital equipment necessary to make these conversions.

Main cable 30 carries cable television signals into a house or building (not shown). Main cable 30 is a source for video signals which can be selected by televisions or other tuning devices distributed throughout the home or building. Alternatively, a VCR 31 or other video broadcast devices such as a laser disc player or a video camera can also serve as the video signal source or as an alternate video signal source for selection of signals by the tuning devices distributed throughout the home or building. Accordingly, the description which follows applies to the selection of a VCR 31 or other source device for video signals as well as the selection of cable television signals and can be incorporated into System 10.

Figure 2:
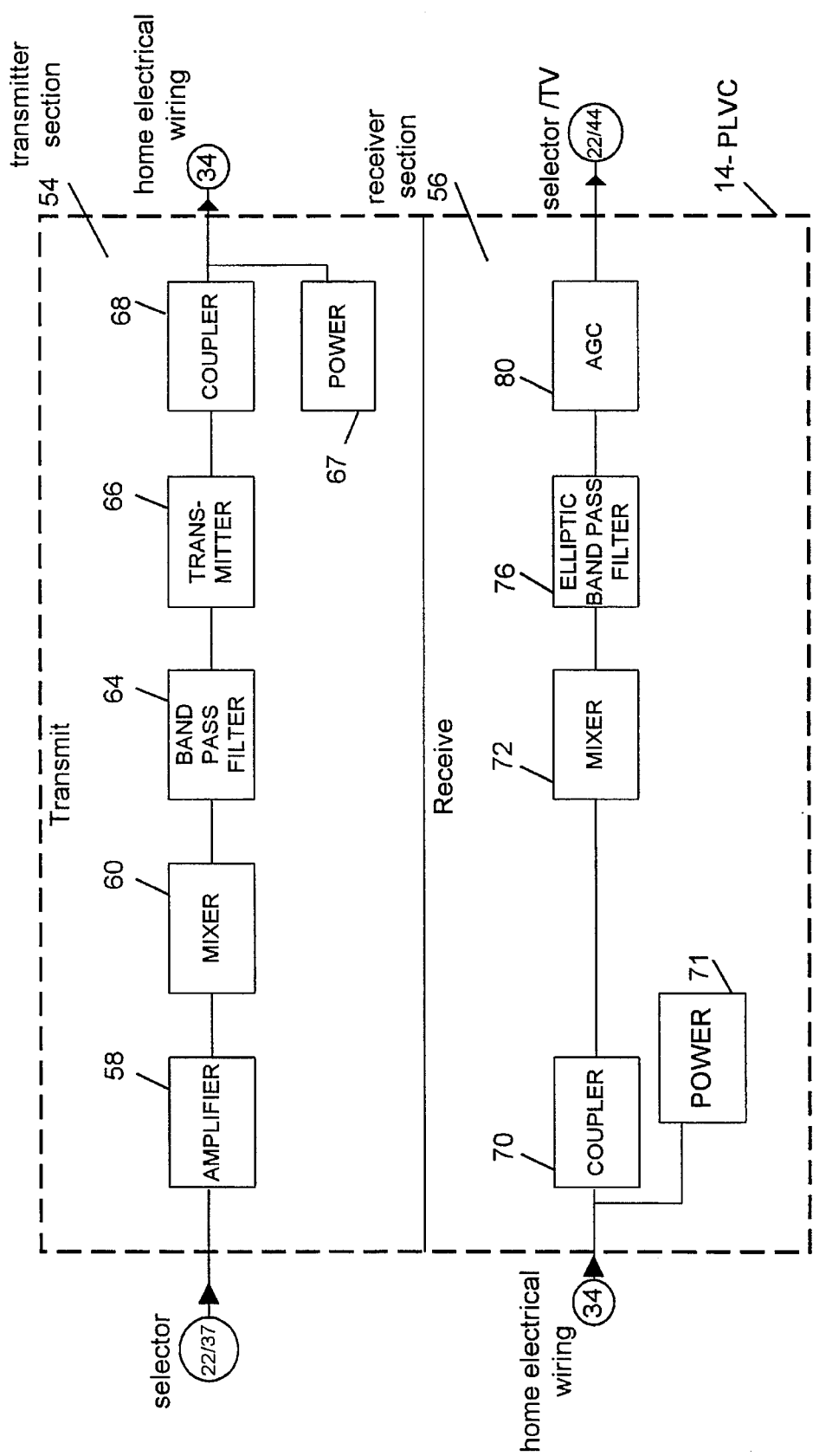
FIG. 2 is an exemplary schematic block diagram of a power line video coupler, comprising a transmitter section and a receiver section in accordance with the present invention.

Cable 30 is connected to distribution box 12, via lead lines 32. As the present invention can distribute signals to four simultaneously and independently operating television sets or viewing/recording devices, four lead lines 32 connected to cable 30 are shown. Each lead line 32 is connected to a separate channel selector (tuner) of distribution box 12. The channel selectors of the present invention can tune cable television channels as is understood by those skilled in the art. Selectors 1–4 are correspondingly numbered—22, 24, 26, and 28. Further, each selector is connected to a corresponding power line video coupler (PLVC). PLVCs 1–4 are correspondingly numbered 14, 16, 18, and 20. The selectors and power line video couplers operate in pairs as distribution devices. It is possible for the selectors and PLVCs to be separate devices or a combined device (as illustrated in FIG. 2). For example, channel selector 1 and PLVC 1 operate together; channel selector 2 and PLVC 2 operate together; channel selector 3 and PLVC 3 operate together; and channel selector 4 and PLVC 4 operate together. Accordingly, throughout this description of the present invention, although only one channel selector/PLVC pair may be described, each additional channel selector/PLVC pair will be understood to operate in a similar fashion to the one being described. The difference between the four channel selector/PLVC pairs shown in distribution box 12 is that each PLVC is tuned to operate at a different frequency band. This is to accommodate the four separate 6 Mhz video signals which can be transmitted between the 2 MHz and 30 MHz frequency band and which will be discussed more fully herein.

Distribution box 12 is connected to home electrical wiring 34 to distribute the cable television/video signals throughout a home or building. The connection between distribution box 12 and home electrical wiring 34 will most commonly be made at a junction box or a fuse box (not shown), which in many instances will be located in proximity to the entry of cable 30 into a home or building. Typically, the cable and electrical entry points into a home or building are in a basement or garage. Distribution box 12 may be of a size suitable for mounting on a wall near a fuse box or junction box and may be no more obtrusive than the fuse box or junction box. It is not necessary, however, for distribution box 12 to be located or connected to a junction box or fuse box. Distribution box 12 can be located anywhere in a building where connection to electrical wiring 34 can be made and also access all rooms, via electrical wiring 34, where television sets are to be used. Such a location will also require access to source signals such as cable television or VCRs. If only VCR signals were being distributed (i.e., 4 VCR signals to choose from), proximity to a cable television connection 30 would not be required. It is also possible to set up system 10 so that a user could select a VCR signal or a cable television signal.

The connection between home electrical wiring 34 and distribution box 12 is made at each PLVC. As each PLVC is tuned to a different, overlapping, or interfering frequency, a single connection can be made from distribution box 12 to electrical wiring 34, as long as each PLVC is tied into this connection.

A television set or other viewing or recording device can be placed in every room of a home or building or multiple television sets or tunable devices can be placed in every room. In the present system, however, only four can be operated independently (i.e., tuned to an independent channel) and simultaneously.

Referring back to FIG. 1, four television sets 44, 46, 48, and 50 are shown to represent four independent and simultaneous viewing or recording devices. Each television is connected to a remote device (receiver/selector) 36, 38, 40, and 43, respectively. Each remote device contains a PLVC which corresponds in number to the PLVC contained in distribution box 12 with the same PLVC numbering. This represents that each of the four PLVC units is correspondingly tuned to the same frequency as the PLVC unit contained in distribution box 12. Also present in each remote device is a means for selecting a cable television channel (or alternatively, a separate source such as VCR 31). An example of such a selection system is a remote control cable selector box as is commonly provided by cable television service providers. This type of system is illustrated as remote control 53 which operates in the infra-red spectrum as is commonly used in cable television selectors, VCRs, televisions, stereo equipment, and video cameras, and is therefore understood by those skilled in the art. A separate remote control device, such as remote control 53 would operate each selector section 37, 39, 41, and 43 of the corresponding remote devices, 36, 38, 40, and 42. Alternatively, a key pad entry located on a remote device could be used in addition or instead of remote control 53.

In operation, a user desiring to watch a particular cable television channel would use a remote control device 53, and pointing the device at a remote device such as remote device 36, select a channel. Remote device 36 receives the infra-red signal from remote control device 53 at its selector 37. The selection signal (the channel selected) is then transmitted through PLVC 14 over home electrical wiring 34 to the corresponding PLVC 14 in distribution box 12. PLVC 14 communicates this signal to selector 22 which tunes the requested cable channel from cable 30. The cable channel tuned by selector 22 is then communicated through PLVC 14 in distribution box 12 through home electrical wiring 34 and back to remote device 36. The cable channel signal is then communicated through PLVC 14 located in remote device 36 to television set 44 for viewing by the user. A similar operation can take place for television sets 46, 48, and 50 simultaneous with the operation described for television 44.

A VCR 52 can also be disposed between a remote device box and a television as is shown with respect to remote device 42 and television 50. This is a common setup when standard cable television boxes are used with VCRs and televisions.

In operation, System 10 will operate transparent to the user. The user will not recognize any difference between the operation of System 10 and a current cable distribution system. A difference in performance and operation will be the availability of a cable television outlet wherever an electrical outlet is located in a home, as every electrical outlet will also serve as a cable television outlet. Also, the possibility of having an alternate source signal such as VCR 31 will now be possible and selectable. With the increasing number of smaller and better quality televisions, the ability to connect a television set at any location in the house where an electrical outlet is located will be highly advantageous. Also, a VCR or other video signal source can be located anywhere there is an electrical outlet. It is not required by the present system that distribution devices be centrally located.

There is shown in FIG. 2 a block diagram of a power line video coupler used in the present invention. Power line video couple 14 shown in FIG. 2 should be understood to be identical to PLVC 16, 18, and 20, except that each of the four power line video couplers is tuned to a different frequency band between 2 MHz and 30 MHz which are non-overlapping and do not interfere with each other.

PLVC 14 is shown divided into a transmitter section 54 and receiver section 56. Whether located in a remote device (with a television set) or in distribution box 12, each PLVC is required to both transmit and receive signals. When located in a remote device (connected to a television set), a PLVC will have to transmit a selector signal to select a cable television station. It will then be required to receive the corresponding cable television signal transmission. When located in a distribution box 12, each PLVC will be required to receive the selection signal for a particular cable television channel and then transmit the corresponding cable television signal.

Using selector 22, PLVC 14 and television set 44 as an example, transmit section 54 must take its input either from selector 22 in distribution box 12 or selector 37 in remote device 36. A cable television signal will be provided by selector 22. This signal is fed into amplifier 58 and then into mixer 60. A frequency signal produced by oscillator 62 of mixer 60 is combined with the input signal from selector 22. The mixed signal is then sent through a band pass filter 64 to filter out the component of the signal from mixer 60 which is not desired, allowing the cable television signal to pass through. The filtered signal is then sent through transmitter 66 and out through coupler 68 to the home electrical wiring 34. Coupler 68 contains a pair of power line couplers as disclosed in Applicant's copending application, U.S. Ser. No. 08/180,421, filed Jan. 11, 1994; A transmitter power supply 67 is also shown in FIG. 2.

When receiving a signal, the signal comes in through home electrical wiring 34 into a (pair of) coupler 70 which is located in receiver section 56 of PLVC 14. Coupler 70 is identical to coupler 68, but operates as a receiver instead of a transmitter and has a power supply 71. The signal then goes through mixer 72 which operates in an opposite manner to the operation of mixer 60. This will "unmix" the downconverted signal, restoring it to its original frequency. The unmixed signal then leaves mixer 72 and enters an elliptic band pass filter 76. The filtered signal is then put through an automatic gain control 80 to optimize this signal which is then output to television set 44.

In operation, the selector/receivers of the present invention are designed to transmit signals in the frequency range between 60 and 72 megahertz when sending a signal between a remote device and a television set. VHF channel 3 corresponds to the frequency range of 60–66 megahertz, while channel 4 corresponds to the frequency range of 66–72 megahertz. Thus, a user selects channel 3 or 4 to eliminate interference as is commonly done when connecting a VCR to a television set.

The present system is designed to transmit over a house or building electrical power lines in a frequency range between 2 and 30 megahertz. In the present system, the video signal with a 6 megahertz bandwidth (between 60–66 megahertz for channel 3 and 66–72 megahertz for channel 4) is down-converted to a signal with a bandwidth between 2 and 30 megahertz for video signal transmission. A 6 megahertz bandwidth is necessary for video transmission in analog format. Accordingly, there is a range of 28 megahertz in which 6 megahertz signals can be transmitted. Accordingly, this allows up to four separate transmission bands to be used without interfering with each other. This in turn, is the number of independently and simultaneously television sets or viewing or recording devices which can operate in accordance with the present invention and is illustrated as such in FIG. 1.

For each separate television, a 6 megahertz bandwidth must be set aside. For example, beginning at 2 megahertz, adding 6 megahertz to this reserves the band between 2 and 8 megahertz. However, the selector signal sent from the remote device requires its "own" frequency so as not to interfere with the video signal transmission. Therefore, an extra four, single megahertz frequencies must be set aside to transmit the selector signal. Smaller or larger frequency bands could also be used, with a one megahertz frequency band described herein as an example.

An example allocation of frequency bands is to use the 2–6 MHz frequencies as the four selector signal frequencies and begin the video signal (6 MHz bandwidth) at 6 MHz. Another way of allocating frequency bands is to add the one MHz selector signal to the six MHz video signal, yielding a frequency bandwidth of seven MHz. The first or last portion of this seven MHz frequency band could be used for the selector signal. Other ways of allocating frequency bands should be understood by those skilled in the art.

Assuming the selector signal frequencies extend between 2 and 6 MHz, the first video signal (i.e., first television) extends between 6 and 12 megahertz. The second signal (i.e., the second television) extends between 12 and 18 megahertz. The third signal (i.e., the third television) extends between 18 and 24 megahertz, and the fourth (i.e., the fourth television) extends between 24 and 30 megahertz.

Each PLVC unit is designed to down-convert for transmission and up-convert for reception in one of these four bandwidths. Thus, PLVC 14, for example, will be designed to operate in a first bandwidth between 6 and 12 megahertz. Accordingly, mixer 60 and mixer 70 in PLVC 14 are designed to down-convert and up-convert the signal so that the signal sent through home electrical line 34 is in the 6 to 12 megahertz range. If channel 3 (between 60–66 megahertz) is used, it is necessary to generate a mixing signal of 54 megahertz. This 54 megahertz signal is generated by oscillators 62 and 74. By mixing in a signal of 54 megahertz, the 6 megahertz signal sits between 6 megahertz and 12 megahertz. If channel 4 (in the 66–72 megahertz bandwidth), is used then mixers 60 and 72 have to mix in a signal of 60 megahertz. As each selector/receiver is switch selectable between channel 3 and 4, oscillators 62 and 74 provide a different signal to mixers 60 and 72 respectively, depending upon whether channel 3 or channel 4 was chosen by the user.

Mixtures 60 and 72, actually mix both the positive and negative component of the wave form generated by oscillator 62 and 74. As the signal is down-converted for transmission through electrical lines 34, it is necessary to filter out the unwanted (additive) portion of the wave form. Band pass filter 64 only allows signals in the 2–30 megahertz band to pass. Elliptic band pass filter 76 in receiver 56 carries out a similar function.

Figure 3:
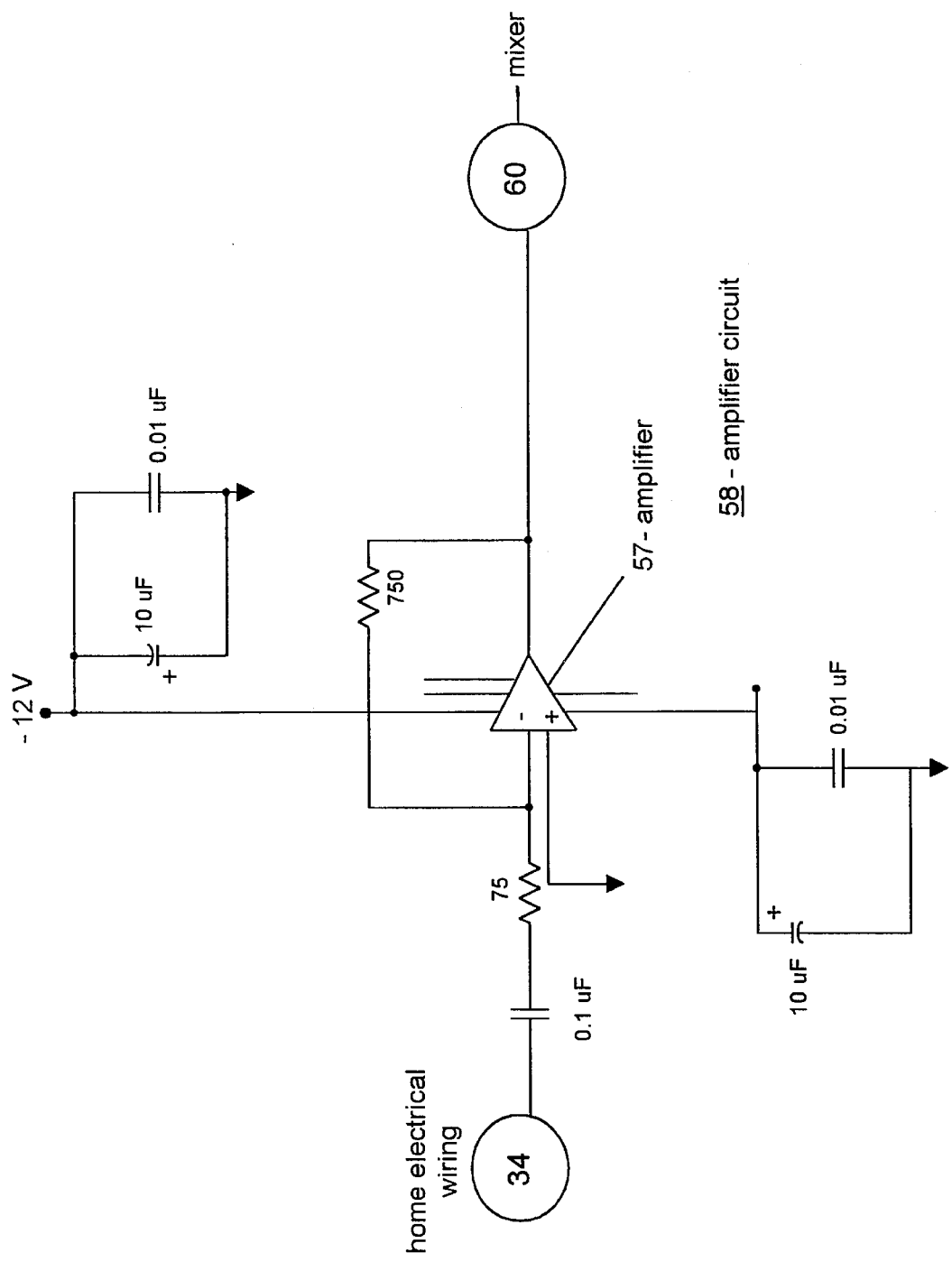
FIG. 3 is a schematic diagram of a transmitter amplifier circuit 58 shown in FIG. 2.

There is shown in FIG. 3 a schematic diagram of amplifier circuit 58. Amplifier circuit 58 provides an amplified signal to mixer 60. Amplifier circuit 58 contains an amplifier 57 which is part No. AD811, made by Analog devices.

Figure 4:
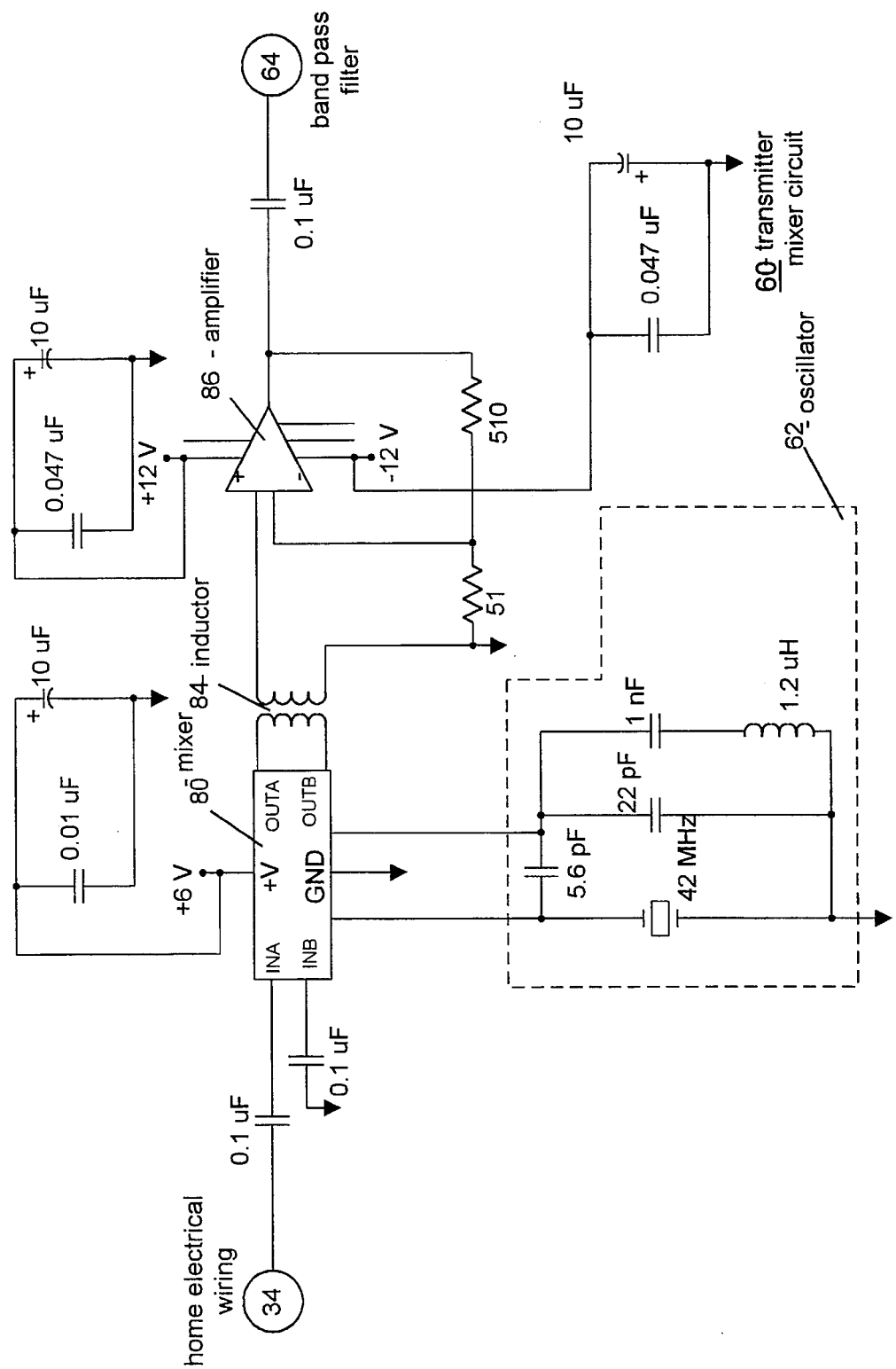
FIG. 4 is a schematic diagram of transmitter mixer 60 shown in FIG. 2.

There is shown in FIG. 4 a schematic diagram of transmitter mixer circuit 60. Transmitter mixer 60 receives its input from amplifier 58. A signal (difference signal) from oscillator 62 is generated within transmitter mixer 60 and is combined with the signal from electrical line 34 at mixer 80. An example of mixer 80 is integrated circuit No. NE612 made by Phillips. The down-converted signal passes through inductor 84 and then through amplifier 86 before being transmitted to band pass filter 64.

Oscillators 62 or 74 could alternatively be designed with adjustable LC circuitry to adjust the frequency needed to be generated by the oscillator circuit.

Figure 5:
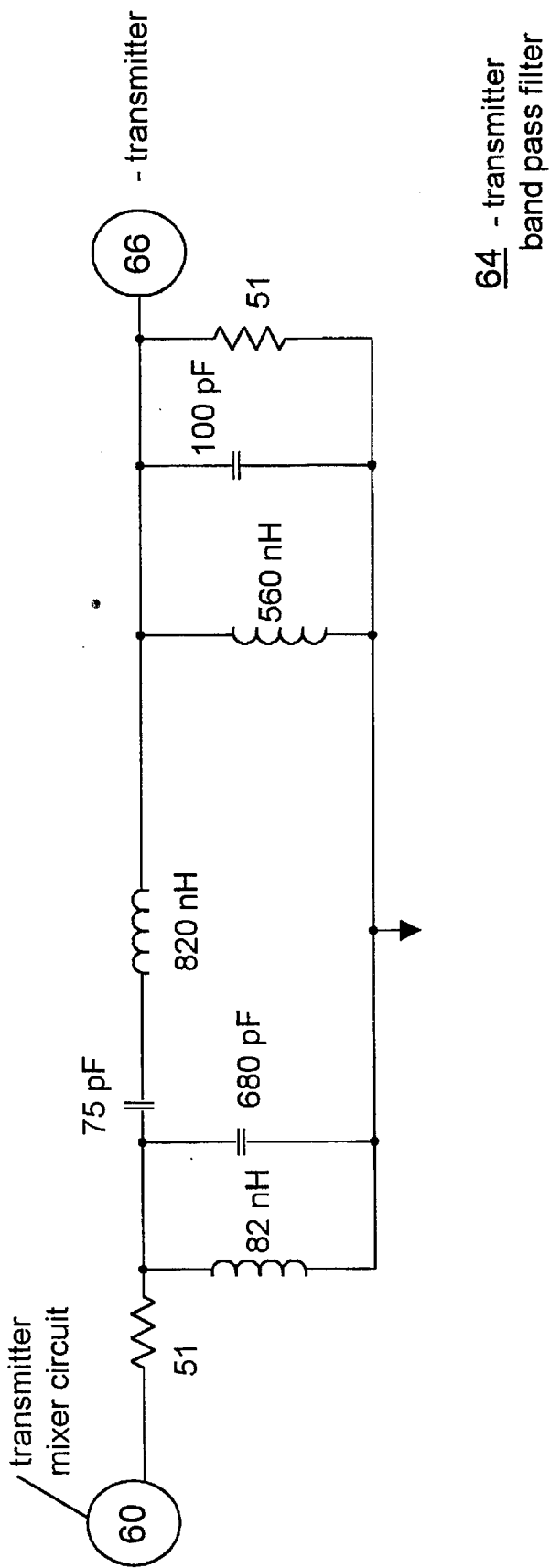
FIG. 5 is a schematic diagram of transmitter band pass filter 64 shown in FIG. 2.

There is shown in FIG. 5 a transmitter band pass filter 64. Band pass filter 64 is designed to pass signals in the 2–30 megahertz frequency and will be understood by those skilled in the art.

Figure 6:
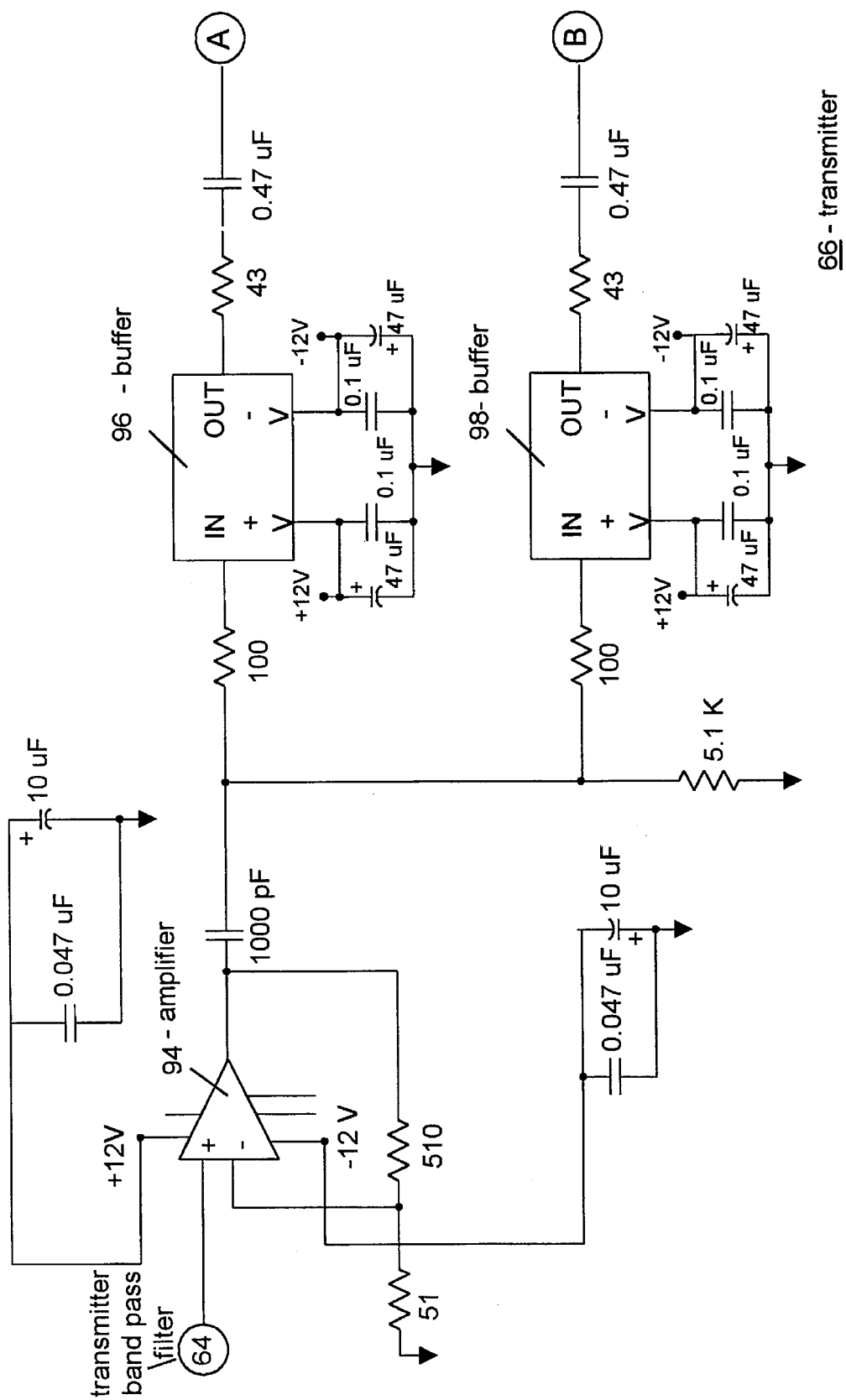
FIG. 6 is a schematic diagram of transmitter 66 shown in FIG. 2.

There is shown in FIG. 6 a schematic diagram for transmitter 66. After the input signal from band pass filter 64 enters transmitter 66, it is amplified at amplifier 94, Part No. AD811 made by Analog Devices. As the couplers 68 used in an exemplary embodiment of the present invention will transmit a signal with a bandwidth of up to 3 megahertz, two 3 megahertz components must be generated for output. Buffers 96 and 98, Part No. EL2008 made by Elantec are used to separate out two three megahertz components of the six megahertz video signal. If a signal is being generated between 6 and 12 megahertz as described above, output "A" from buffer 96 would carry 3 megahertz of that signal (i.e., 6 to 9 megahertz) while output "B" from buffer 98 would carry the other 3 megahertz of that signal (i.e., 9 to 12 megahertz). In this way, the full 6 megahertz of the video signal is ultimately output through coupler 68.

Figure 7:
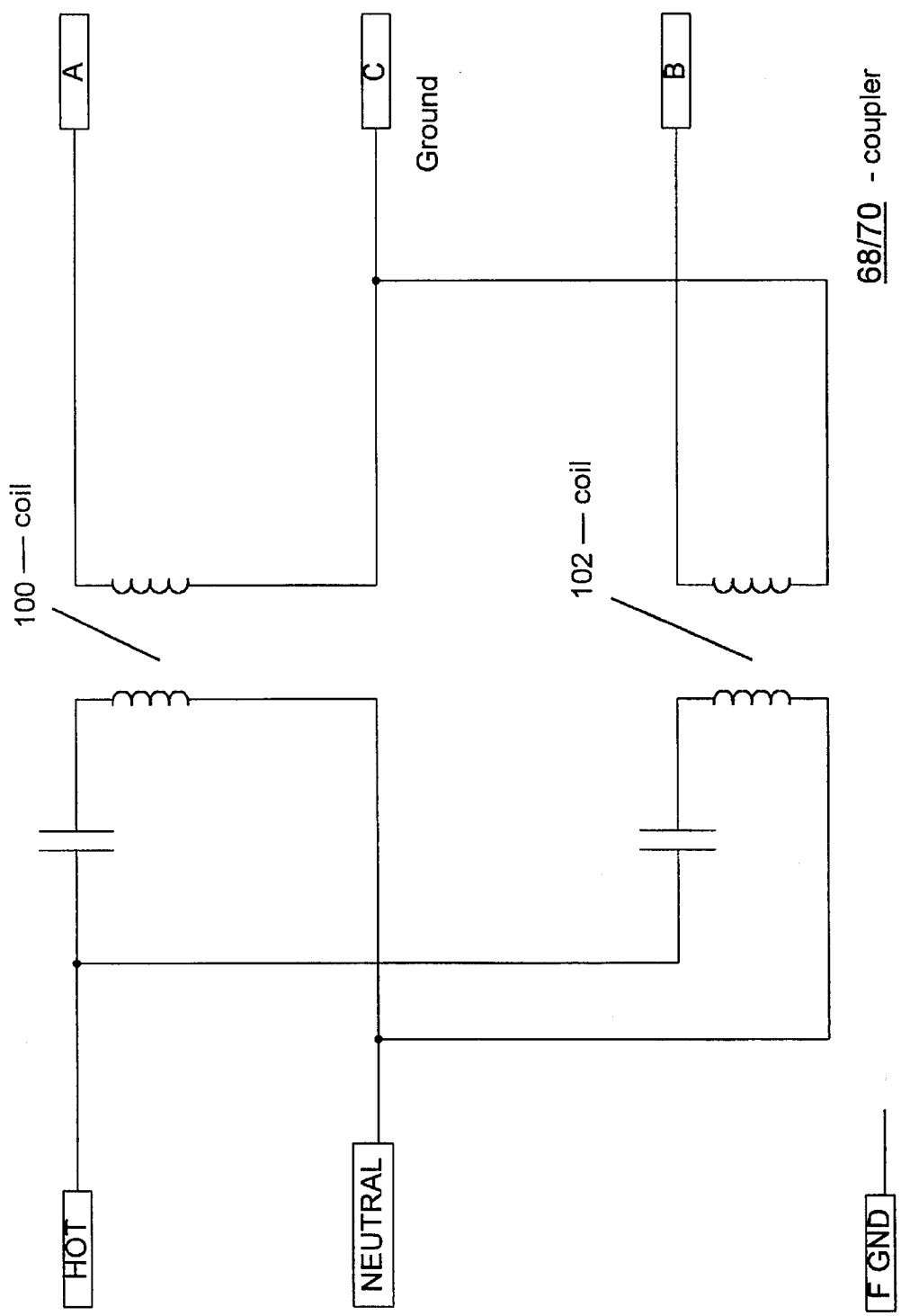
FIG. 7 is a schematic diagram of couplers 68 and 70 shown in FIG. 2.

There is shown in FIG. 7 a diagram of an example coupler which can be used as coupler 68 or coupler 70. Couplers 68 and 70 actually comprise a pair of couplers in order to provide a full 6 megahertz video signal. The "A" and "B" designations correspond to the inputs to the coupler from transmitter 66 (see FIG. 6) in the transmit mode and the output from coupler 70 (see FIG. 8) in the receive mode. Coils 100 and 102 represent the dielectric core (air core) couplers described in Applicant's copending patent application, U.S. Ser. No. 08/180,421, filed Jan. 11, 1994. As the couplers are designed for use with grounded (three conductor) electrical outlets and wire, ground connections are shown in FIG. 7. Couplers 68 and 70 match the characteristic impedance of the AC electrical wiring using a dielectric core coil.

Figure 8:
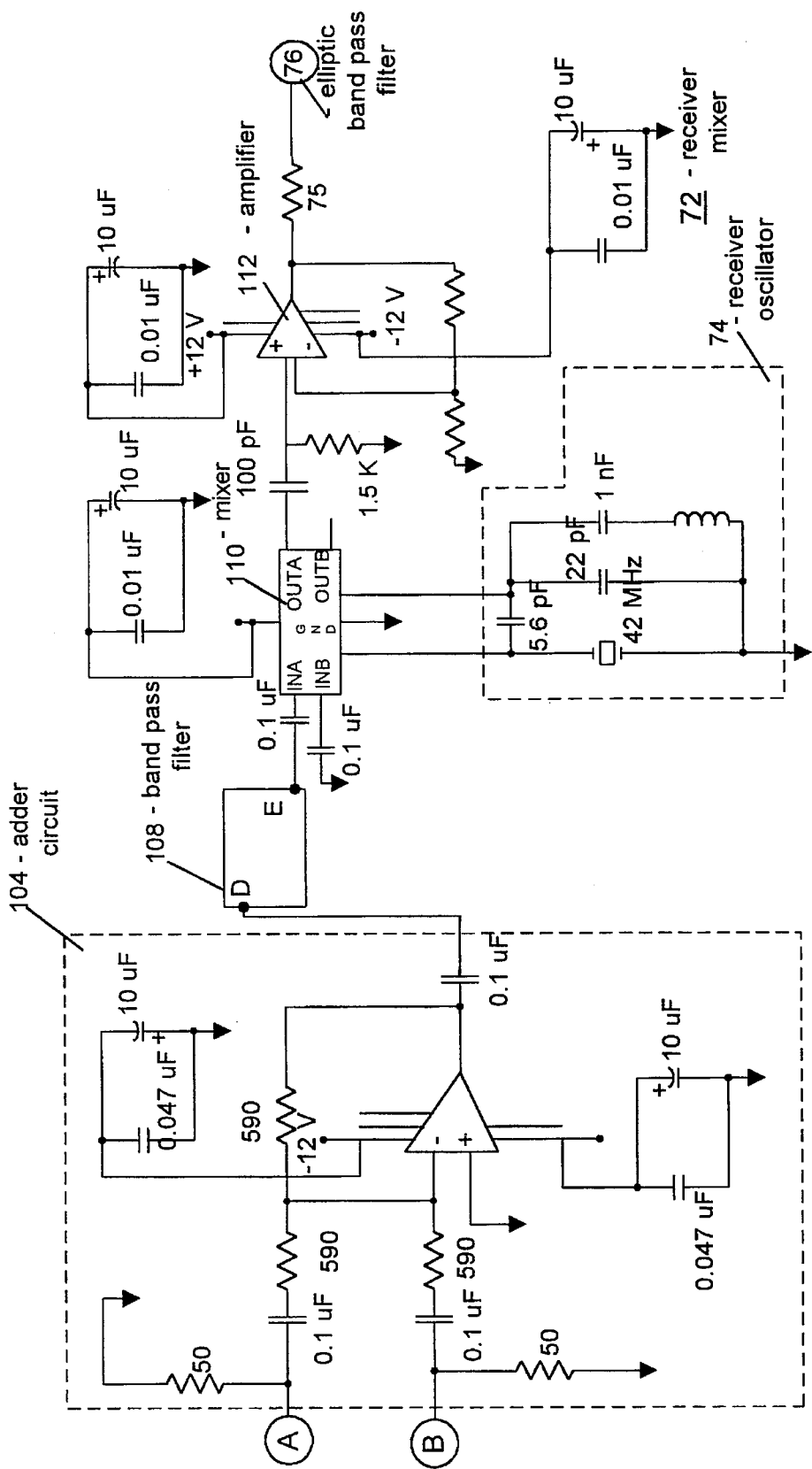
FIG. 8 is a schematic diagram of receiver mixer 72 shown in FIG. 2.

There is shown in FIG. 8 a diagram of an example receiver mixer 72. Receiver mixer 72 contains an adder circuit 104 with inputs "A" and "B", corresponding to outputs "A" and "B" of coupler 70 shown in FIG. 7. Inputs "A" and "B" each receive signals with a bandwidth of 3 MHz, which when added together in adder circuit 104 recreate the 6 MHz video signal.

Figure 9:
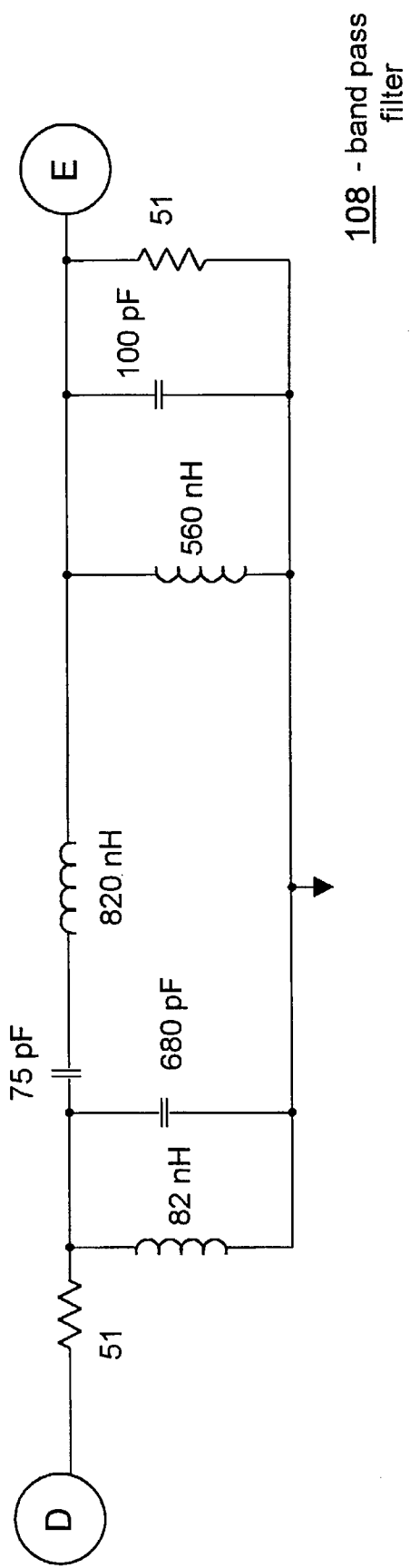
FIG. 9 is a schematic diagram of receiver band pass filter 108 shown in FIG. 8.

The 6 MHz output signal from adder 104 enters bandpass filter 108 (an example schematic diagram of which is shown in FIG. 9). Bandpass filter 108 in the exemplary embodiment shown in FIG. 8 allows the 18–24 MHz signal to pass through, filtering out any remaining signal. The output signal from bandpass filter 108 enters mixer 110 which is Part No. NE612 from Phillips, which mixes in a signal (difference signal) from receiver oscillator 74 to up-convert the 6 MHz video signal to the channel 3 (60–66 MHz) or channel 4 (66–72 MHz) frequency. The up-converted signal passes through an amplifier 112, producing an output signal, which is fed into elliptic bandpass filter 76.

There is shown in FIG. 9 a schematic diagram of an example bandpass filter 108 used in receiver mixer 72. Example bandpass filter 108 is tuned to allow the 18–24 MHz signal to pass, filtering out other frequencies.

Figure 10:
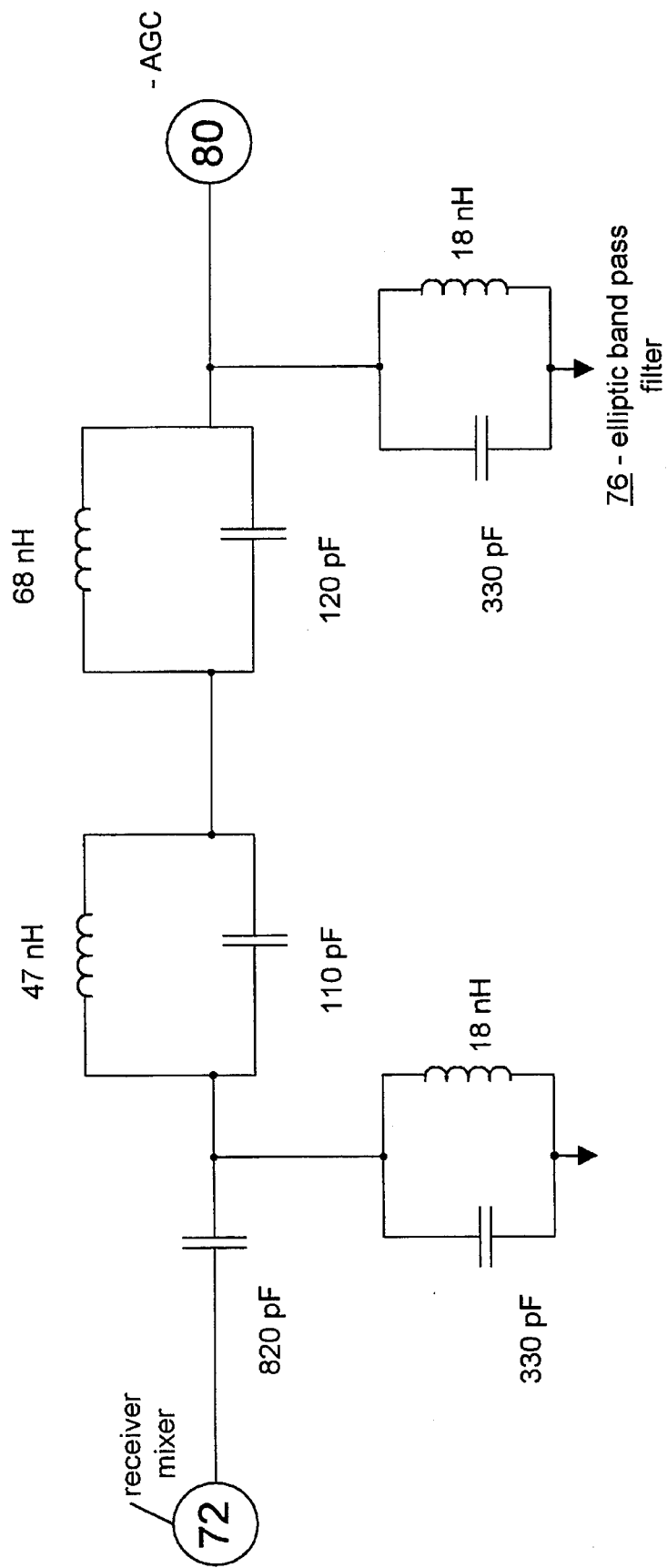
FIG. 10 is a schematic diagram of receiver elliptic band pass filter 76 shown in FIG. 2.

There is shown in FIG. 10 a schematic diagram of an example elliptic bandpass filter 76. Example elliptic bandpass filter 76 is a Bessel filter, which is a linear filter. It is tuned to pass the 60–66 MHz signal and filter out other signals. It is comprised of capacitive and inductive components.

Figure 11:
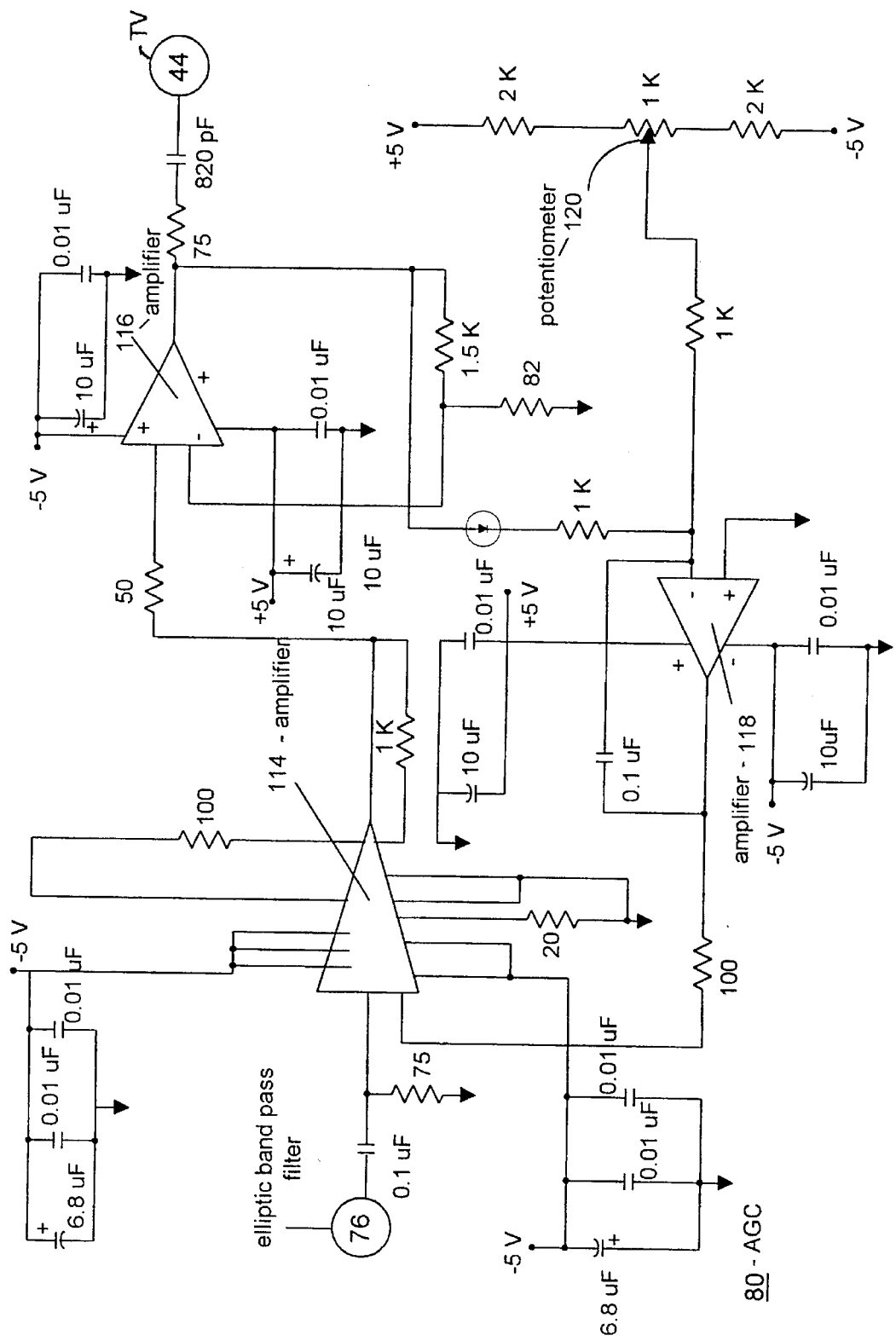
FIG. 11 is a schematic diagram of automatic gain control amplifier 80 shown in FIG. 2.

There is shown in FIG. 11 a schematic diagram of an example Automatic Gain Control (AGC) 80. AGC 80 receives its input from elliptic bandpass filter 76 in receiver section 56. AGC 80 provides increased gain to television 44 to enhance picture quality. AGC 80 includes several amplifiers, namely amplifier 114 (part no. CLC522 by Comlinear), amplifier 116 (part no. CLC401 by Comlinear) and amplifier 118 (part no. CLC420 by Comlinear). A potentiometer 120 is used to set the output level by allowing a DC voltage adjustment of plus or minus one volt.

A television set such as television 44 may be capable of having an input in the 1 volt, peak to peak range. For inputs to AGC 80 in the 30 dB range, AGC 80 is tuned to provide an output (input to television 44) of approximately 1 volt, peak to peak. Using AGC 80 expands the effective distance (for receiving a signal) of system 10 by allowing a remote device to be wired with up to approximately an additional 1000 feet of electrical wiring between the remote device and a distribution device.

Although the present system has been described with respect to signals sent over AC electrical wiring, system 10 could also be used with twisted pair wiring (telephone wiring) instead of AC electrical wiring. A system involving twisted pair wiring increases the distance which a useable signal can travel to approximately 20,000 feet.

The present system has been described as allowing the simultaneous, use of four independent television set because of the four six megahertz bands that can be used between 2 and 30 megahertz. This does not prevent, the use of multiple, dependent viewing/recording devices. For example, if one television set has a PLVC tuned to a particular cable television channel, using one of the four bands which have been allocated between 2 and 30 megahertz, additional PLVC units, tuned to the same band could be used, allowing additional viewing/recording devices to tune to the same channel. Such a set up would be advantageous for applications where multiple viewings of the same program are necessary, such as in schools, businesses and conferences.

While particular embodiments of the present invention are disclosed herein, it is not intended to limit the invention to such disclosure, and changes and modifications may be incorporated and embodied within the scope of the following claims:

What is claimed:

1. A video distribution system for selectively distributing video signals originating from at least one video signal source having a plurality of independent video signals comprising:
   a) a display monitor;
   b) AC electrical wiring;
   c) a remote device connected to said display monitor and to said AC electrical wiring comprising:
      1) a first video signal selector device for generating a selection signal corresponding to one of said plurality of independent video signals,
      2) a first transmitter/receiver tuned to a first frequency band for:
         i) matching the characteristic impedance of said AC electrical wiring,
         ii) transmitting said selection signal over said AC electrical line, and
         iii) receiving said one of said plurality of independent video signals;
   d) a distribution device connected to said AC electrical wiring and to said at least one video signal source comprising:
      1) a second transmitter/receiver tuned to said first frequency band for:
         i) matching the characteristic impedance of said AC electrical wiring,
         ii) receiving said selection signal, and
         iii) transmitting said one of said plurality of independent video signals corresponding to said selection signal over said AC electrical line to said; remote device
      2) a second video signal selector for tuning said one of said plurality of independent video signals from said video signal source for transmission to said display monitor.

2. The video distribution system as recited in claim 1 further comprising a second remote device and a second distribution device each having a respective, first and second transmitter/receiver tuned to a second frequency band.

3. The video distribution system as recited in claim 2 further comprising a third remote device and a third distribution device each having a respective, first and second transmitter/receiver tuned to a third frequency band.

4. The video distribution system as recited in claim 3 further comprising a fourth remote device and a fourth distribution device each having a respective first and second transmitter/receiver tuned to a fourth frequency band.

5. The video distribution system as recited in claim 1 wherein said transmitter/receiver are tuned to a frequency band between 2 and 30 Mhz.

6. The video distribution system as recited in claim 2 wherein all of said transmitter/receiver are tuned to frequency bands between 2 and 30 Mhz.

7. The video distribution system as recited in claim 3 wherein all of said transmitter/receiver are tuned to frequency bands between 2 and 30 Mhz.

8. The video distribution system as recited in claim 1 wherein said transmitter/receiver are tuned to frequency bands between 2 and 30 Mhz.

9. The video distribution system as recited in claim 1 wherein the bandwidth of said first frequency band is between 6 and 7 MHZ.

10. The video distribution system as recited in claim 2 wherein the bandwidth of said first frequency band is between 6 and 7 MHZ.

11. The video distribution system of claim 1 wherein said first transmitter/receiver comprises:
   a) a transmitter circuit comprising:
      1) a transmit oscillator circuit for generating a first difference signal at a predetermined frequency;
      2) a transmit mixing circuit for mixing said first difference signal with a transmit signal to produce a first mixed signal;
      3) a transmit band pass filter circuit for filtering said first mixed signal in a predefined bandwidth to produce a down-converted signal;

4) a transmit power line coupler for transmitting said down-converted signal over said AC electrical wiring;

b) a receiver circuit comprising:
1) a receive oscillator circuit for generating a second difference signal at said predetermined frequency;
2) a receive power line coupler for receiving said down-converted signal;
3) a receive mixing circuit for mixing said second difference signal with said down-converted signal to produce a second mixed signal;
4) a receive band pass filter for filtering said second mixed signal in said predefined bandwidth to produce an up-converted signal for transmission to a reception device.

12. The video distribution system of claim 11 wherein said transmit signal is said selection signal.

13. The video distribution system of claim 11 wherein said transmit signal is said at least one of said plurality of video signals.

14. The video distribution system of claim 11 wherein said first difference signal is between 30 and 64 Mhz.

15. The video distribution system of claim 11 wherein said second difference signal is between 30 and 64 Mhz.

16. The video distribution system of claim 11 wherein said predefined bandwidth is between 6 and 7 Mhz.

17. The video distribution system of claim 11 wherein said transmit power line coupler and said receive power line coupler each are comprised of first and second power line couplers which respectively transmit and receive first and second split signals to and from said AC electrical wiring.

18. The video distribution system of claim 17 wherein said receiver circuit further comprises a second receive mixing circuit for combining said first and second split signals from said first and second transmit power line couplers.

19. The video distribution system of claim 11 further comprising a receive automatic gain control for providing additional gain to said up-converted signal.

20. The video distribution system of claim 11 wherein said reception device is said second video selector.

21. The video distribution system of claim 11 wherein said reception device is said display monitor.

22. The video distribution system of claim 1 further comprising at least one additional remote device connected to said AC electrical wiring and an additional display monitor, having an additional transmitter/receiver tuned to the same frequency band as said first transmitter/receiver.

23. The video distribution system of claim 1 wherein twisted pair wiring is used instead of AC electrical wiring.

24. The video distribution system of claim 1 wherein said one of said plurality of independent video signals is transmitted a distance in the range of 1 to 1000 feet.

25. The video distribution system of claim 23 wherein said one of said plurality of independent video signal is transmitted a distance up to approximately 20,000 feet.

* * * * *